United States Patent [19]

Turner

[11] 4,319,307
[45] Mar. 9, 1982

[54] ILLUMINATED HANDLEBAR

[76] Inventor: Samuel Turner, 525 N. Atlanta Ave., Massapequa, N.Y. 11758

[21] Appl. No.: 108,420

[22] Filed: Dec. 31, 1979

[51] Int. Cl.³ .............................................. F21J 33/00
[52] U.S. Cl. ...................................... 362/72; 362/217; 362/221; 362/191; 362/396
[58] Field of Search .................. 362/72, 217, 221, 191

[56] References Cited

U.S. PATENT DOCUMENTS 2,416,160  2/1947  Davidsson .............................. 362/72
4,088,882  5/1978  Lewis .................................... 362/72

Primary Examiner—Stephen J. Lechert, Jr.
Attorney, Agent, or Firm—Robert L. Slater, Jr.

[57] ABSTRACT

An illuminated handlebar fabricated in two sections, the handlebar housing a replaceable fluorescent bulb supported therein by resilient mounting adapters and preferably powered by a DC power pack removably mounted to the bicycle frame. The handlebar has a plurality of apertures located as desired from which a shower of light emanates whereby the roadway as well as the rider are illuminated.

9 Claims, 6 Drawing Figures

ILLUMINATED HANDLEBAR

FIELD OF INVENTION

The present invention is related to an improvement in handlebar construction, the improvement being the incorporation of removable illuminating means within the handlebar frame thereby providing an additional safety feature to riders, pedestrians, and other vehicular traffic. The device can be easily installed in one of its several embodiments on bicycles, tricycles, motorcycles, and other velocipedes; indeed whenever a handlebar is used.

PRIOR ART

Bicycles in current use are illuminated with a single headlight attachable to the handlebar or frame of a bicycle. Examples of such headlight means are illustrated in U.S. Pat. No. 506,477 to Davies, U.S. Pat. No. 2,169,256 to Kraeft, and British Pat. No. 614,413. A dual headlight is shown by U.S. Pat. No. 1,994,837 to Onge. Wintermantel U.S. Pat. No. 2,944,833 illustrates that a headlight and taillight as well as side lights may be installed in a tricycle frame. Lewis U.S. Pat. No. 4,088,822 shows bicycle illumination means attachable to the frame.

SUMMARY OF INVENTION

It is an object of this invention to provide illumination means housed within a bicycle handlebar.

It is another object of this invention to illuminate both rider and roadway with a shower of light.

It is a further object of this invention that the light be of a constant intensity, even when the rider is motionless.

It is also an object of this invention to provide such illumination as described as an additional safety feature.

Another object is to provide illumination of different color to rider and roadway, if desired.

These and other features and advantages are best visualized from a reading of the specification below which describes various embodiments of the invention in greater detail.

The present invention differs considerably from the prior art. In summary the handlebar of the present invention installs an elongated fluorescent light bulb within a bifurcated handlebar, thus, permitting the easy removal of the light bulb for replacement. The handlebar itself is apertured proximate to the placement of the bulb. The number and location of the apertures used dependent on the degree of illumination desired. In this way illumination is provided across the width of the bicycle, and not merely as a single beam directed to the path traveled. With apertures also located facing the rider, both rider and path are showered with light, quite unlike prior art illumination means.

DESCRIPTION OF THE DRAWINGS

FIG. 4 is an alternate embodiment of the invention wherein screw means supply added reinforcement of the assembly.

DETAILED SPECIFICATION

Figure 1:
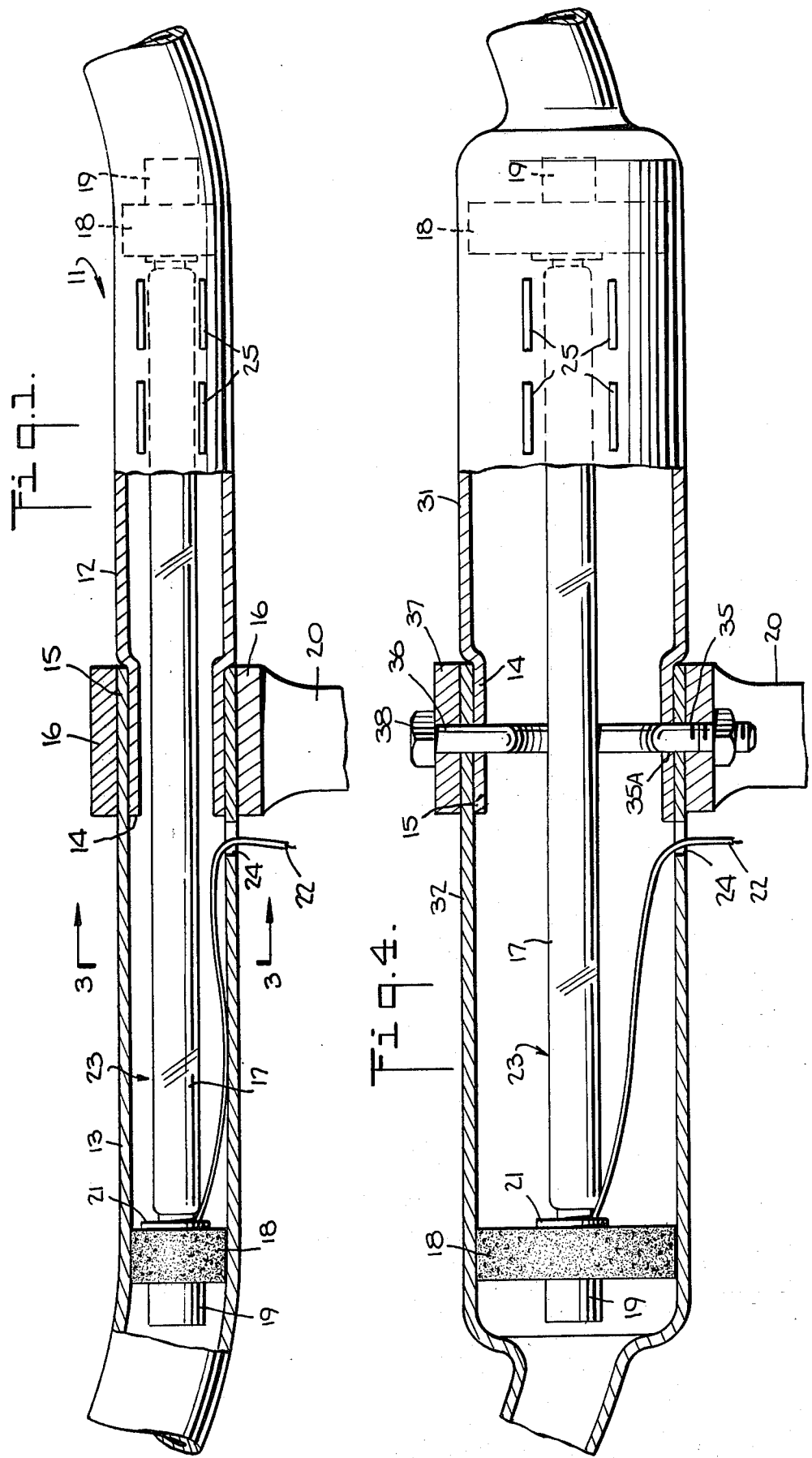
FIG. 1 is a cutaway frontal view of the handlebar.

Referring to FIG. 1 the handlebar 11 of the present invention is comprised of two members 12 and 13. In this embodiment each member 12 and 13 comprises a half portion of the handlebar 11, although as will be seen below this is not critical. The portion of each member that is held by the rider of the bicycle is not shown inasmuch as they are conventional. Members 12 and 13 have at their proximate ends male and female ferrule 14 and 15 respectively, said ferruled ends being slidably attachable to one another. The female ferruled member is adapted to engage gooseneck clamp 16 which is more clearly shown in FIG. 6. By tightening bolt 29 shown in FIG. 6 the assembled handlebar 11 would be fixedly connected to the steerer bar 20 of bicycle 30. It should be understood that while reference is made throughout for use of this invention on a bicycle, the handlebar herein described may be used with any velocipede having handlebar steering means. Thus, it is intended that tricycles, motorcycles, mopeds and the like could benefit from incorporating this invention therein.

Again referring to FIG. 1, an elongated fluorescent bulb 17 to which have been attached resilient mounting adapters 18 is insertable within the handlebar members 12 and 13. The bulb extends the length of the frontal portion of the handlebar, that is, essentially throughout the width of a bicycle. The bulb 17 has insulated end pieces 19 which support the glass bulb portion. Typical of such bulbs are those used portably and having bakelite or other plastic end pieces that may be handheld. The bulb portion is preferably of unbreakable plastic rather than glass thereby providing yet an additional safety feature. The resilient adapters 18 are inserted onto the inert ends, and prefereably are fabricated from foam rubber. For better support and to prevent moving, the adapters are conveniently adheredly connected to the inert ends, although a lip 21 may be provided to prevent slippage. Electrical connecting means 22 are also attached to the bulb to complete the assembly 23. Such means could be a wire that conveniently passes through hole 24 in either member 12 or 13 for connection to the power source 26 (shown in FIG. 6).

Figure 6:
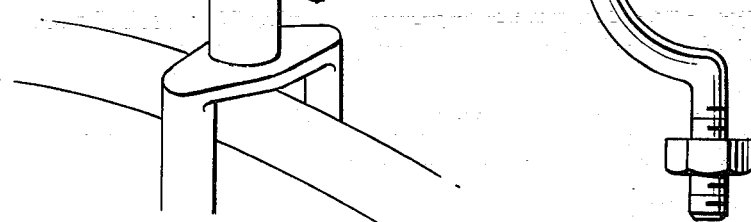
FIG. 6 is a view of the device as installed on a bicycle.

The assembly 23 is insertably mountable within the handlebar members 12 and 13, and said members slidably connected to one another, the female ferruled member 13 engaging the clamp 16. The adapters 18 are suitably resilient to enter the member 12 and 13 and can easily pass through the male ferruled member 12. Once in place the adapters provide a tight fitting support for the bulb and prevent inadvertent movement thereof. Each member, as illustrated in FIG. 1 by member 12 is provided with a plurality of apertures 25 whereby light emanating from the handlebar showers the road and rider in light as shown in FIG. 6. These apertures or holes may have any number of geometric configurations, although slots or slits provide best illumination. The number and location of the apertures can be such that only the roadway is illuminated, or, alternatively, may extend throughout the circumference of the assembled handlebar so that both rider and roadway are illuminated. If desireable, plastic inserts (not shown) of different colors may be inserted between the bulb and handlebar members to provide colored illumination.

FIG. 6 shows the assembled handlebar in use. Connecting means 22 are shown connected to power source 26. It is preferable that said source 26 be a DC battery operated power pack provided with spring clips 27 for removable installation on the frame of the bicycle. The power pack supplies a constant intensity of light and is not dependent on the motion of the bicycle. However, if desired, the connecting means could be attached to a generator which obtains mechanical energy from a moving wheel as are well known in the art.

Figure 2:
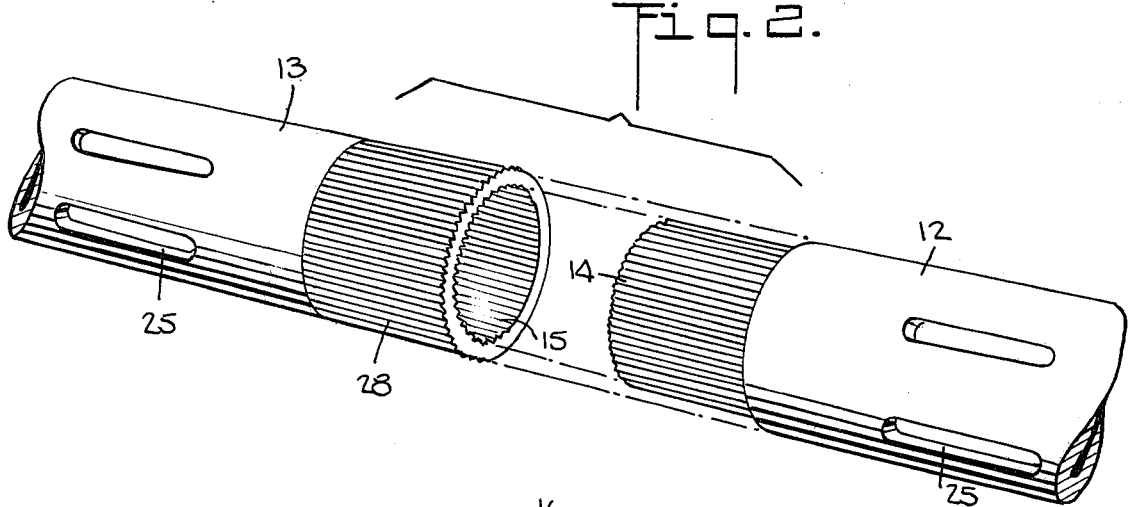
FIG. 2 is an exploded perspective view of the connection between the bifurcated handlebar members.

FIG. 2 is an exploded perspective view of the ferruled connection between the two handlebar members. If desired, female member 13 may have a knurled outer surface 28 to better grip clamp 16.

Figure 3:
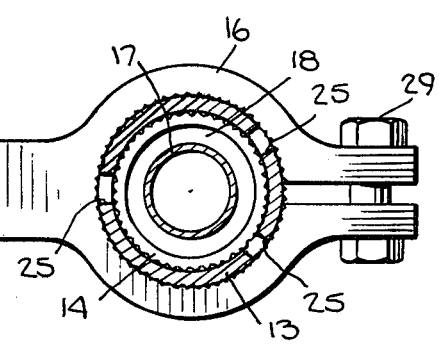
FIG. 3 is a cross sectional view of the handlebar of FIG. 1 along the plane 3—3.

FIG. 3 is a cross sectional view along section 3—3 of FIG. 1. The figure shows in greater detail the arrangement of bulb 17, adapters 18, and male and female handlebar members 12 and 13 within clamp 16. Bolt 29 supplies force required to hold the assembly fixedly in place. Clamp 16 is connected to the bicycle by means of steerer rod 20.

Figure 5:
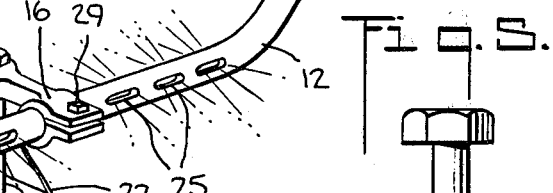
FIG. 5 is a drawing of the preferred screw means for use in the alternate embodiments of my invention.

FIG. 4 illustrated as alternate embodiment of the invention. Here, handlebar members 12 and 13 have enlarged housing section 31 and 32 respectively. The ferruled ends also have bores 35 and 35A, and when aligned with bore 36 in clamp 37 permit the passage of bolting means 38. Bolt 38, shown in FIG. 5, is adapted to permit entry around the inserted bulb assembly 23. Bolt 38 has a C-shaped center section which is of somewhat larger diameter than bulb 17, and smaller than housing member 31 and 32. As should be readily apparent, there is sufficient "play" between housing means 31 and 32 and bulb 17 to permit the insertion of bolt 38. In all other respects this embodiment is similar to that of FIG 1. The enlarged housing are also beneficial in that a substantially greater number of apertures can be provided, and there is sufficient room to provide the aforementioned transparent plastic color strips.

A second alternate embodiment employing enlarged housing sections 31 and 32 is possible, the said sections, however, being of unequal length and fastened using bolt means 38 at a point distal from the clamp. Thus, the clamp may be of the type shown in FIG. 3. That is, the clamp does not require bores therethrough. Bores 35 and 35A are provided in the ferruled ends for inserting bolt means 38, shown in FIG. 5.

The handlebar of the present invention can also be implemented by minor variations to the various elements described above, especially, with respect to bolt and clamp supports. In particular, other arrangements may be provided to insert the handlebar members. For example, key and keyway and similar connecting means are available. Hence, the foregoing description is intended to be illustrative rather than limiting of the concepts herein disclosed.

I claim:

1. An illuminated handlebar adapted for attachment to a bicycle, velocipede and the like using a gooseneck clamp connected to a steerer rod, the handlebar comprising:
   (a) an elongated flourescent bulb having insulated supporting end pieces,
   (b) a pair of resilient mounting adapters attached to each inert end of the bulb,
   (c) electrical connecting means attached at one end to the bulb,
   (d) power means, and
   (e) a first and second handlebar member, each member being a half portion of the handlebar, the first and second members having respectively at one end a male and female ferrule, said second member being adapted to engage said clamp, the bulb, adapter and connecting means assembly being insertable into the members, the other end of the connecting means passing through a hole proximate to either ferrule for connection to the power means, said members being slideably mounted at the ferruled ends and having a plurality of apertures proximate to the inserted elongated bulb whereby light emanating from the apertures illuminates both rider and path traveled.

2. An illuminated handlebar adapted for attachment to a bicycle, velocipede and the like, the handlebar comprising:
   (a) a gooseneck clamp having top and bottom bores,
   (b) screw means having a C-shaped center section,
   (c) an elongated fluorescent bulb having insulated supporting end pieces, the diameter of the bulb being smaller than the arc of the C in said screw means,
   (d) a pair of resilient mounting adapters attached to each inert end of the buld,
   (c) electrical connecting means attached at one end to the bulb,
   (f) power means, and
   (h) a first and second handlebar member, each said member being a half portion of the handlebar and having an enlarged diameter housing section unitary to said member, the first and second housing section having respectively male and female ferruled ends and each section having a plurality of apertures, the second section being adapted to engage said clamp, the bulb, adapter and connecting means assembly being insertable into the housing sections, the other end of the connecting means passing through a hole proximate either ferrule for connection to the power means, said housing sections being slideably mounted at the ferruled ends whereby light emanating from the apertures illuminated both rider and path traveled, the ferrules also having bores therethrough which when aligned with the bores in the clamp allow for passage of said screw means around the bulb, whereby a handlebar assembly ridigly connected to the clamp is obtained.

3. An illuminated handlebar adapted for attachment to a bicycle, velocipede and the like using a gooseneck clamp connected to a steerer rod, the handlebar comprising:
   (a) screw means having a C-shaped section,
   (b) an elongated fluorescent bulb having insulated supporting end pieces, the diameter of the bulb being smaller than the arc of the C in said screw means,
   (c) electrical connecting means attached at one end to the bulb,
   (d) power means, and
   (e) a first and second handlebar member, said second member being greater than a half portion of the handlebar, each said member having an enlarged housing section unitary to said member, the first and second housing sections having respectively male and female ferruled ends and each section having a plurality of apertures, the second section being adapted to engage said clamp, a portion thereof extending beyond said clamp, the bulb, adapter and connecting means assembly being insertable into the housing sections, the other end of the connecting means passing through a hold in the second housing section proximate to the clamp for connection to the power means, said housing sections being slideably mounted at the ferruled ends whereby light emanating from the apertures illuminates both rider and path traveled, the ferrules also having bores therethrough which when aligned allow for the passage of said screw means around the bulb, whereby a rigid handlebar assembly is obtained.

4. The handlebar of claims 1, 2 or 3 wherein the power means is a power pack mountable to the frame of the bicycle or velocipede.

5. The handlebar of claim 4 where the power pack is removably mounted by snap-on clips.

6. The handlebar of claim 1, 2 or 3 wherein the shape of the apertures is selected from a group consisting of slots, slits, holes and combinations of same.

7. The handlebar of claims 1, 2 or 3 wherein said adapters are fabricated from foam rubber and the like, and are adhesively connected to said bulb.

8. The handlebar of claims 1, 2 or 3 wherein the supporting end pieces of the bulb have a lip to prevent slippage of the mounting adapters.

9. The handlebar of claim 6 further comprising colored plastic transparent inserts between the handlebar and the bulb whereby illumination of different colors is provided.

* * * * *